July 25, 1933.  C. E. JOHNSON  1,919,557
SHIELDED MOTOR ASSEMBLY
Filed Aug. 22, 1928
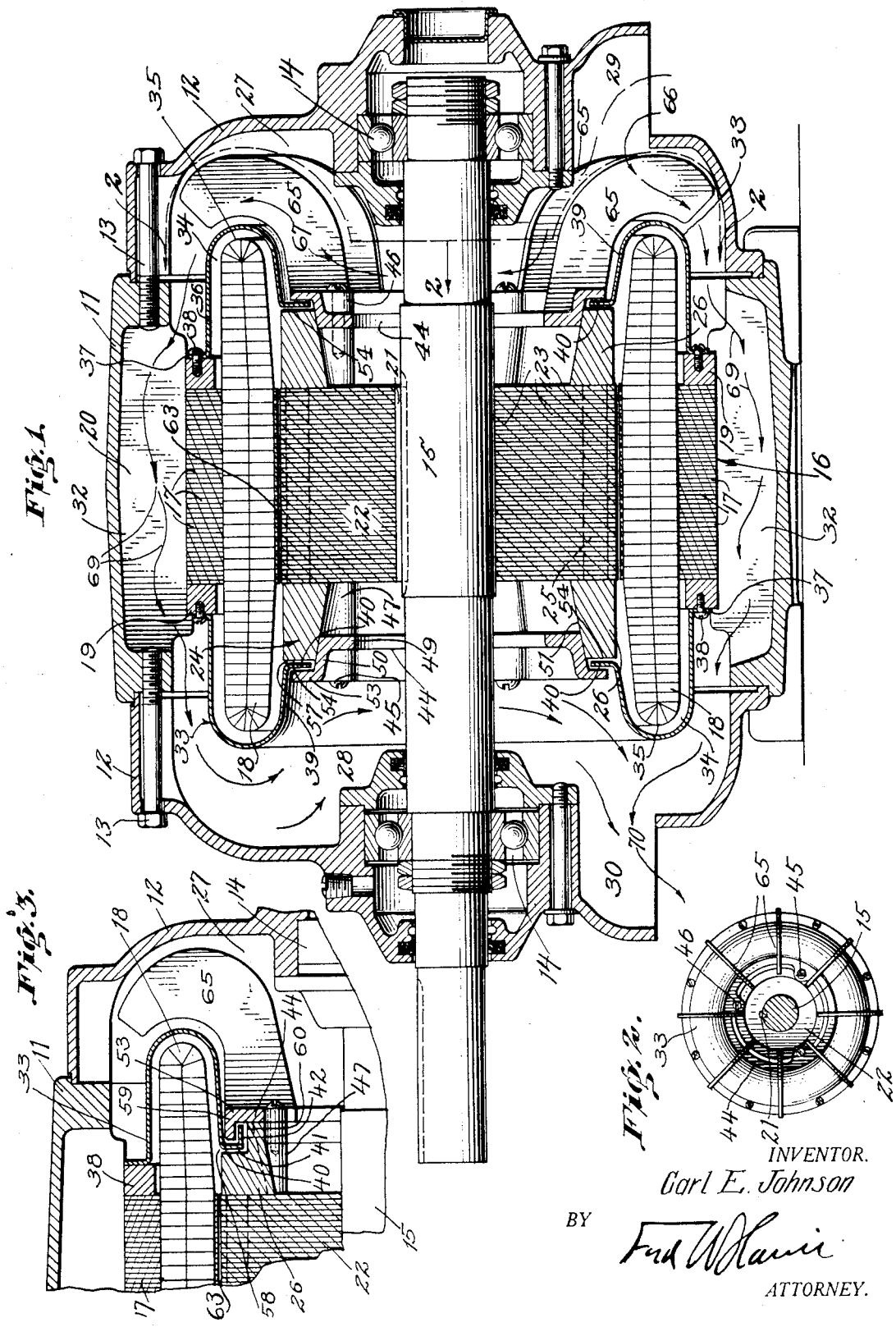
INVENTOR.
Carl E. Johnson
BY
ATTORNEY.

Patented July 25, 1933

1,919,557

UNITED STATES PATENT OFFICE

CARL E. JOHNSON, OF PASADENA, CALIFORNIA, ASSIGNOR TO STERLING ELECTRIC MOTORS, OF LOS ANGELES, CALIFORNIA, A CORPORATION OF CALIFORNIA

SHIELDED MOTOR ASSEMBLY

Application filed August 22, 1928. Serial No. 301,296.

My invention relates to electrical motor construction, and consists of an electrical motor in which the vital parts are protected from the weather, and in which these vital parts are not liable to be damaged or to deteriorate.

The motor of my invention, by virtue of the protecting of the vital parts, may be used where weather conditions are bad, in chemical plants, and in the various industries where injurious matter is likely to enter the ordinary motor, without any danger of the vital parts being damaged, or without danger of their deteriorating.

I accomplish this object of my invention by providing the ends of the stator with shields, such as sheet copper, which enclose the winding of the stator and also the annular space between the stator and the rotor.

Another object of my invention is the provision of cooling means for the motor. The housing of the motor is designed to form a circulation space around the stator and rotor, and a circulating means, such as a fan, is provided for causing the circulation. Very important to this object are the shields which separate the vital parts of the motor from the circulation space and prevent the circulating medium from contacting these vital parts.

Another object of my invention is to attain a maximum cooling efficiency by bringing the circulating medium into contact with the rotor. In order to accomplish this object I terminate the shields near the outer part of the rotor. The ends of the rotor form a wall of the circulation space, and are cooled by the circulating medium.

It is a further object of my invention to provide a seal between each shield and the rotor, which will deny access to the stator-winding, but will permit the rotor to revolve freely.

A further object of the invention is the provision of a specific type of sealing means for forming the seal between the shield and the rotor, which sealing means consists of an annular groove formed on one of the parts, and a flange formed on the other of the parts.

A further object of this invention is to provide a motor in which a circulating fan is carried by a removable plate which cooperates with the rotor to form one of the annular grooves.

Other objects and advantages will be pointed out in the following description.

Referring to the drawing in which two forms of my invention are illustrated,

Fig. 1 is a vertical section.

Fig. 2 is a section taken on the line 2—2 of Fig. 1, Fig. 2 being on a reduced scale.

Fig. 3 is a fragmentary section showing another form of the invention.

Referring to Figs. 1 and 2, the motor in which my invention is incorporated includes a body 11, to which end-brackets 12 are secured by suitable bolts 13. The end-brackets 12 carry ball bearings 14, which rotatably support a shaft 15.

Supported in the body 11 of the motor is a stator 16. The stator 16 consists of a laminated body of magnetic material 17, and a winding 18. The stator is secured in the body 11 by means of end-rings 19, which engage radial webs 20 of the body 11. Secured to the shaft 15 by a suitable key 21 is a rotor 22. The rotor 22 has a laminated body of magnetic material 23, and a secondary winding 24, which consists of radial conductor bars 25 and end-rings 26.

The parts which I have described may be fashioned according to ordinary motor practice, and do not constitute a part of this invention. The specific details in which my invention is incorporated will now be described.

Between the ends of the stator 16 and the rotor 22, and the end-brackets 12, are circulation chambers 27 and 28. The circulation chamber 27 has an inlet 29 connected to it, this inlet 29 being formed in one of the end-brackets 12; and the circulation chamber 28 has an outlet 30 connected to it, this outlet 30 being formed in the other of the end-brackets 12. Connecting the circulation chambers 27 and 28 are circulation passages 32, which are formed around the stator 16 and between the webs 20. During the operation of the motor a cooling medium is circulated between the circulation chambers 27 and 28 and the passages 32.

For the purpose of protecting the vital parts of the motor I provide shields 33 at the opposite ends of the stator 16 and the rotor 22. The shields 33 are preferably made from sheet copper, and are preferably designed and secured in place as shown in Figs. 1 and 2. The shields 33 are each provided in U-shaped cross-section so as to provide cavities 34 which receive the outer ends 35 of the winding 18. Connected to outer legs 36 of the shields 33 are flanges 37 adapted to be secured in air-tight relation to the rings 19 by suitable screws 38. Inner legs 39 of the shields 33 are provided with annular flanges 40. In the preferred form of the invention the annular flanges 40 extend radially inward from the inner legs 39. In the alternative form of the invention, as shown in Fig. 3, the flanges 40 have radial portions 41 and cylindrical portions 42 which extend outward from the inner edges of the radial portions 41.

Secured to the opposite ends of the rotor 22 are end-plates 44. Attachment is made by means of attaching screws 45, which extend through bosses 46 of the end-plates 44 and into bosses 47 which are formed integrally with the end-plates 26 of the rotor. The end-rings 44 have annular webs 49 adapted to be clamped against the outer ends of the bosses 47, and walls 50 which are made of a shape to conform to the adjacent surfaces of the end-rings 26. In Figs. 1 and 2 the walls 50 are shown frusto-conical so that they may conform to the internal frusto-conical faces 51 of the end-rings 26.

Outer radial walls 53 extend outwardly adjacent to and parallel to the end faces 54 provided by the end-rings 26. The end flanges 53 cooperate with the end faces 54 to provide annular radial grooves 57, into which the annular flanges 40 are extended.

In the second form of the invention, as shown in Fig. 3, the end-rings 26 have the ends cut away to form annular recesses 58, and the end-plates 44 have cylindrical lips 59 formed at the outer ends of the radial flanges 53. The annular grooves 57 provided between the end-rings 26 and the end-plates 44 have inner cylindrical portions into which the cylindrical portions 42 of the annular flanges 40 of this form of the invention are extended.

When the motor is in operation the rotor and the parts connected thereto revolve. The annular flanges 40, and the annular grooves 57 are designed for preventing access to the winding 18 and also to the annular space designated by the numeral 63, which is present between the periphery of the magnetic body 23 and the inner wall of the magnetic body 17. Due to the closeness of the walls of the annular grooves and the flanges 40, no circulation can take place around the flanges 40. The centrifugal force set up when the rotor is in operation assist in preventing passage between the annular grooves 57 around the flanges 40. The annular grooves 57 and the annular flanges 40 constitute the sealing-means of the invention.

For the purpose of creating circulation through the circulation chambers and the circulation passages of the motor I provide a circulating means in the form of fan-blades 65. In the embodiment shown the fan-blades 65 are carried by one of the end-plates 44, and are curved as shown so as to extend in the circulation chamber 27 partly around the adjacent shield 33. However, other means of mounting the fan-blades may be used, for instance, the fan-blades may be mounted directly on the shaft 15.

A complete operation of the invention is as follows: The windings 18 are energized according to standard practice, and a rotating field is established. The rotating field creates a secondary field in the squirrel-cage of the rotor 22, and the rotor 22 is caused to revolve. The fan-blades 65 rotating with the rotor 22 cause a circulating medium such as air to be drawn through the inlet 29 as indicated by arrows 66. The circulating medium is impelled by the fan-blades 65 through the circulation chamber 27, as indicated by arrows 67, and passes through the circulation passages 32 as indicated by arrows 69. The circulating medium is forced from the circulation passages 32 into and through the circulation space 28, as indicated by arrows 70. The outlet 30 acts as an exit for the circulating medium.

It will be seen that the shields 33 separate the vital parts of the motor from the circulation space, which consists of the circulation chambers and the circulation passages, so that these vital parts will not be damaged by any foreign matter carried by the circulating medium. The circulating medium, however, cools the stator by means of its coming into contact with the outer part of the magnetic body 17 and into contact with the shields 33, which dissipates any heat generated by the operation of the motor. The seal provided between the shields 33 and the ends of the rotor 22 absolutely prevents the circulation medium from entering the cavities 34 between the shields 33.

The ends of the rotor 22 form the inner walls of the circulation chambers 27 and 28, and the circulating medium comes into direct contact therewith, so that the stator is cooled.

From the foregoing description the important features of the invention will be obvious, but for the purpose of emphasis these features will be epitomized as follows:

The broad feature of the invention is to protect the vital parts of the motor, and an equally broad feature is to provide a motor having circulation means, and in which the circulating medium is prevented from contacting the vital parts of the motor.

Another feature of the invention is the providing of the seal between the shields and the rotor, so that it will be impossible for access to be procured to the interior of the shields.

A further feature of the invention resides in the structural details of the sealing means which the invention provides.

Another feature of the invention is the exposing of the ends of the rotor 22 to the circulating medium so that the rotor, as well as the stator, will be cooled.

An additional feature of the invention is the forming of the fan-blades on one of the end-plates of the invention, though other supporting means may be used.

It will of course be obvious that other features of less importance inhere in the various details of construction of the form of the invention disclosed in the drawing.

I claim as my invention:

1. In an electrical motor, the combination of: a stator having a winding and having a bore; a rotor adapted to rotate in said bore; a shaft on which said rotor is supported; shields arranged at the opposite ends of said stator and said rotor, said shields being so positioned as to enclose said winding and the space in said bore around said rotor; annular rings having grooves normal to the axis of rotation of said rotor and near the periphery of said rotor at the ends thereof, the ends of said rotor being exposed between said rings and said shaft; flanges on said shields, extended into said grooves; a housing surrounding said stator and said rotor and forming a circulation space around said stator and outside said shields; and circulating means for creating a circulation in said circulation space.

2. In an electrical motor, the combination of: a stator having a winding and having a bore; a rotor adapted to rotate in said bore; a shaft on which said rotor is supported; shields arranged at the opposite ends of said stator and said rotor, said shields being so positioned as to enclose said winding and the space in said bore around the periphery of said rotor so that the ends of said rotor are exposed; sealing means forming seals between both of said shields and the peripheral part of the ends of said rotor; a housing surrounding said stator and said rotor and forming a circulation space around said stator and outside said shields; and a fan carried by one of said sealing means for creating a circulation through said circulation space and against said rotor ends.

3. In an electrical motor, the combination of: a stator having a winding and having a bore; a rotor adapted to rotate in said bore; a shaft on which said rotor is supported; shields arranged at the opposite ends of said stator and said rotor, said shields being so positioned as to enclose said winding and the space in said bore around the periphery of said rotor; rings attached to the ends of said rotor and providing grooves near the periphery of said rotor, the ends of said rotor being exposed between said rings and said shaft; flanges on said shields, extended into said grooves; a housing surrounding said stator and said rotor and forming a circulation space around said stator and outside said shields; and a fan carried by one of said rings for creating a circulation in said circulation space.

4. A motor of the character described, including: a stator having a winding; a rotor operative within the bore of said stator; a casing surrounding said stator and said rotor, said casing providing an inlet chamber at one end and an outlet chamber at the other end with intercommunicating passages connecting said chambers exteriorly of said stator and in communication with the outer portion of said stator; shields connected to the ends of said stator for covering the winding thereof; end rings peripherally connected to said rotor whereby the ends of said rotor are exposed in said chambers, said shields and said rings associating to completely encase said winding and the peripheral portions of said rotor; and a fan connected to one of said end rings for creating a circulation through said chambers and against the exposed ends of said rotor.

5. In an electrical motor, the combination of: a stator having a winding and a bore; a rotor adapted to rotate in said bore; an end ring attached to one end of said rotor; a member associated with said end ring and defining with said end ring a radial groove; a shield arranged at one end of said stator and said rotor, said shield being so positioned as to enclose one end of said winding and having a flange extended into said groove; a housing surrounding said stator and said rotor and forming a circulation space around said stator and outside said shield; and circulating means for directing air into contact with said stator, said shield and said end of said rotor.

6. In an electrical motor, the combination of: a stator having a winding and a bore; a rotor adapted to rotate in said bore; an end ring attached to one end of said rotor; a member associated with said end ring and defining with said end ring a radial groove; a shield arranged at one end of said stator and said rotor, said shield being so positioned as to enclose one end of said winding and having a flange extended into said groove; a housing surrounding said stator and said rotor and forming a circulation space around said stator and outside said shield;

and a fan secured to said member for circulating air into contact with said stator, said shield and said end of said rotor.

7. In a squirrel cage induction motor, the combination of: a stator having a winding and a bore; a rotor of the squirrel cage type adapted to rotate in said bore, said rotor providing end rings near the periphery thereof, each end ring providing an annular groove formed therein; a shaft on which said rotor is supported; shields arranged at opposite ends of said stator and said rotor, said shields being so positioned as to enclose said winding and the space in said bore around said rotor and extending into said grooves of said end rings to form seals between both of said shields and said end rings, the ends of said rotor being left exposed; walls spaced from said shields to form a circulation space outside said shields; and circulating means for creating a circulation in said circulation space.

CARL E. JOHNSON.